United States Patent [19]

Brandenberg

[11] 4,263,941

[45] Apr. 28, 1981

[54] SEQUENTIAL INHIBITOR (NOT) FLUID LOGIC DEVICE

[75] Inventor: Karl A. Brandenberg, Chehalis, Wash.

[73] Assignee: The Aro Corporation, Bryan, Ohio

[21] Appl. No.: 967,292

[22] Filed: Dec. 7, 1978

[51] Int. Cl.[3] .......................... F15C 3/04; F16K 11/04

[52] U.S. Cl. .............................. 137/625.66; 137/625.5

[58] Field of Search .......................... 137/625.5, 625.66

[56] References Cited

U.S. PATENT DOCUMENTS 3,389,720 6/1968 Brandenberg .................. 137/625.66

FOREIGN PATENT DOCUMENTS 2527672 1/1976 Fed. Rep. of Germany ...... 137/625.66

*Primary Examiner*—Gerald A. Michalsky

*Attorney, Agent, or Firm*—Allegretti, Newitt, Witcoff & McAndrews

[57] ABSTRACT

A sequential inhibitor (NOT) fluid logic device has a control input (a), a supply input (b), and an output (c). The output signal is terminated through output (c) from supply input (b) only when a control signal at control input (a) precedes a supply signal at supply input (b). The device includes a series of three plate members defining a connected cavity and chamber. An arrangement of valve seats in the cavity and chamber cooperate with a poppet and diaphragm. The area of the seats cooperative with the diaphragm and poppet insure the sequential operation of the device. An exhaust passage (d) may be actively integrated into a circuit utilizing the device to provide a combined OR fluid logic device and sequential inhibitor having an input (d), a supply input (b), a control input (a) and an output (c).

6 Claims, 4 Drawing Figures

SEQUENTIAL INHIBITOR (NOT) FLUID LOGIC DEVICE

BACKGROUND OF THE INVENTION

In the principal aspect, the present invention relates to a fluid logic device and more particularly to a sequential inhibitor (NOT) fluid logic device.

It is often desirable to provide a sequential logic system to control pneumatically operated equipment, for example. Various fluid logic devices have been proposed and are disclosed in prior publications, e.g. Bouteille, Fluid Logic Devices, John Wiley and Sons. Additionally, many patents have issued which teach various devices and systems including the patent to Brandenberg for a NOT Device, U.S. Pat. No. 3,389,720 issued June 25, 1968, which is incorporated herewith by reference.

Fluid logic systems which provide for sequential operation such as a flip-flop system are very complex if conventional control hardware and techniques such as disclosed in Boutille and the Brandenberg patent referenced above are utilized. Complex systems, such as disclosed in the patent application identified by Ser. No. 63,923, filed Aug. 6, 1979, entitled "Multiple Element Fluid Logic Controls", Brandenberg, inventor, require a multitude of logic elements in order to provide the desired sequential operation. To reduce the number of logic elements in such systems, therefore, sequential fluid logic devices become desirable.

One of the desired fluid logic elements useful in sequential systems is a sequential inhibitor (NOT) device. Such a device would include a first or control input (a), a supply input (b) and an output (c). The output signal (c) generated as a result of flow of fluid through the supply (b) is inhibited by a control input (a) but only if the input (a) sequentially precedes the input (b).

SUMMARY OF THE INVENTION

The apparatus of the present invention comprises a sequential inhibitor (NOT) fluid logic device having a control input (a), a supply input (b) and an output (c) wherein an output signal is terminated through output (c) from supply input (b) whenever a control signal at control input (a) precedes a supply signal at supply input (b).

The device includes a body member defining a cavity for receipt of a poppet and actuator. A separate chamber is defined in opposed relationship to the cavity for receipt of a diaphragm. Valve seats are defined by the cavity. The two valve seats and the active area of the diaphragm are sized to insure a sequential relationship between the switching of the inputs and the output.

It is an object of the present invention to provide a sequential inhibitor (NOT) fluid logic device.

A further object of the present invention is to provide a sequential (NOT) fluid logic device which is easy to manufacture and includes a minimum number of moving parts.

Still a further object of the present invention is to provide a sequential (NOT) fluid logic device which may be utilized for controlling air operated tools and equipment.

A further object of the present invention is to provide a sequential (NOT) fluid logic device which is reliable and economical.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
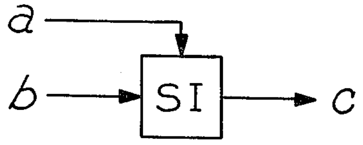
FIG. 1 is the symbol for the sequential (NOT) device.

FIG. 1 is a schematic symbol of a sequential inhibitor device. In FIG. 1 an output (c) is "off" provided a control input signal (a) arrives prior to a supply signal (b). If signal (b) arrives first, before signal (a), the output through (c) will not be inhibited. Thus, the function of the device schematically represented in FIG. 1 can be summarized by stating that output (c) is inhibited provided signals are provided at input (a) followed by a signal at input (b).

Figure 2:
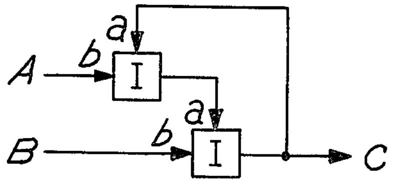
FIG. 2 is a circuit diagram illustrating a prior art configuration of fluidic devices equivalent in function to the device of the present invention.

Prior art inhibitor or NOT devices such as disclosed by Brandenberg U.S. Pat. No. 3,389,720 are not sequence dependent. Two such prior art inhibitor devices would be required to provide the functions of the device schematically illustrated in FIG. 1. FIG. 2 illustrates the manner in which two such prior art inhibitor or NOT devices would be arranged in order to provide the function of the device in FIG. 1. That is, inputs (a) and (b) would be arranged as shown in FIG. 2 so that the output (C) would be "off" only if input (A) preceded input (B).

Figure 3:
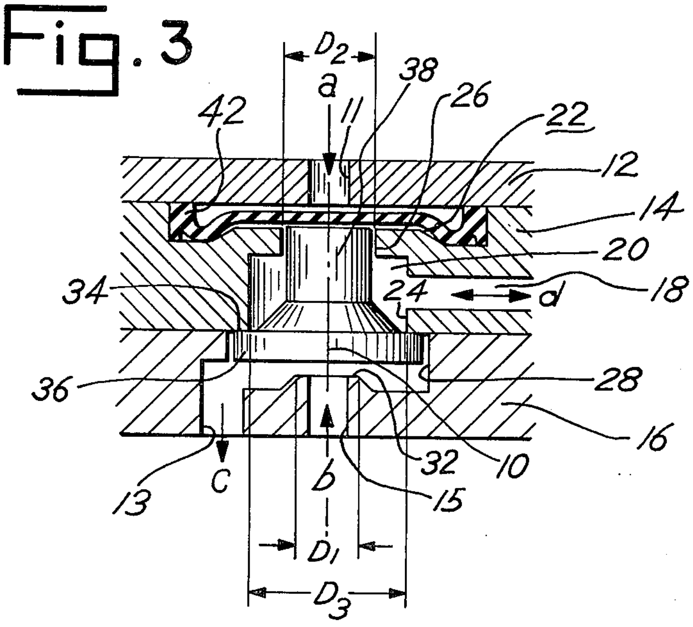
FIG. 3 is a cross sectional view of the improved sequential (NOT) device of the present invention.

FIG. 3 illustrates in cross section the specific structure of the inhibitor of the present invention. The device is generally symmetrical about an axis 10. It is comprised of a cover 12 layered against a body 14 on top of a base 16. Control inlet (a) is defined by channel 11 through cover 12. Base 16 includes outlet (c) defined by channel 13 and supply inlet (b) defined by channel 15.

Body 14 includes an exhaust passage (d) defined by channel 18. Channel 18 connects with an internal cavity 20 which passes through the body 14 and is connected with a chamber 22 defined by the cover 12 and body 14. The cavity 20 is defined by a cylindrical bore 24 which connects with a narrower passage 26 that, in turn, connects with the chamber 22.

Base 16 includes a counterbore 28 into which channel 15 for input (b) is directed. The channel 15 terminates with a seat 32 projecting into the bore 28. The bore 28 has a diameter which is slightly greater than the diameter of the counterbore 24. Thus, a circumferential seat 34 is defined about the periphery of the counterbore 24.

A poppet 36, which is a disc, is cooperative with seat 34 or seat 32 depending on the position of the poppet 36 within the counterbore 28. A stem 38 projects from the poppet 36 into passage 26. A diaphragm 42 fits within the chamber 22 over the passage 26. As a result of this configuration, the seat 32 defines a first effective area $A_1$ represented by the diameter $D_1$.

An intermediate effective area $A_2$ having diameter $D_2$ is associated with the seat which diaphragm 42 makes upon passage 26 as shown in FIG. 3. Area $A_2$ is greater than area $A_1$. The final effective area necessary for consideration is the area associated with the seat 34. This area is represented by the diameter $D_3$ having its associated area $A_3$. Area $A_3$ is greater than area $A_2$. Thus $A_3 > A_2 > A_1$.

In operation, a signal through channel 11 at control input (a) will initially force the diaphragm 42 against the stem 38 thereby driving the poppet 36 onto the seat 32. Since the area $A_2$ is greater than the area $A_1$, a subsequently arriving signal at channel 15 for inlet (b) cannot result in any further movement of the poppet 36. Flow of fluid from channel 15 through channel 13 of outlet (c) is terminated and cannot resume until pressure is released from control input (a).

However, should a signal arrive through the channel 15 at input (b) prior to any signal through channel 11, the poppet 36 will be seated upon seat 34. Since the area $A_3$ associated with seat 34 is greater than the area $A_2$ associated with the diaphragm 42 subsequent signals on the diaphragm 42 through channel 11 cannot effect any change in the switching action of the device. In other words, fluid pressure will continue to be present in the outlet (c). A sequential operation of the device is thus provided.

Figure 4:
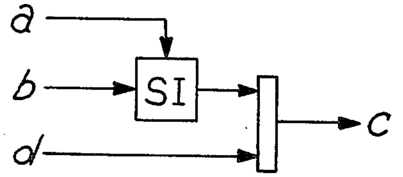
FIG. 4 is a symbol illustrating an alternative use of the structure shown in FIG. 3.

It is also possible to use the device shown in FIG. 3 as a combined sequential inhibitor and OR device as schematically illustrated in FIG. 4. In such an event the exhaust (d) is utilized as an input channel. Providing an input signal through the exhaust (d) or sequentially through the inlets (a) and (b) provides a logic sequence illustrated in FIG. 4. The device of the invention can be used to provide the circuit schematically shown in FIG. 1 as well as the circuit shown schematically in FIG. 4. Therefore, while there has been set forth a preferred embodiment of the invention, it is to be understood that the invention is to be limited only by the following claims and their equivalents.

What is claimed is:

1. A sequential inhibitor (NOT) fluid logic device having a control input (a), a supply input (b), an output (c), and means for terminating an output signal through output (c) from supply input (b) whenever a control signal at control input (a) precedes a supply signal at supply input (b), said device comprising, in combination:

a body member having a cavity, said cavity including a supply port for supply input (b) with a supply seat having a first area ($A_1$), an outlet port for output (c) from the cavity, and an exhaust outlet from the cavity having an exhaust seat in opposed relation to the supply seat and defining an exhaust seat area ($A_3$) greater than the first area ($A_1$);

a poppet in the cavity movable between the supply seat and exhaust seat;

said body member also including a chamber;

a diaphragm in the chamber spaced from the exhaust seat on the side opposite the supply seat, the diaphragm including an active area ($A_2$) said active area ($A_2$) being greater than the first area ($A_1$) and less than the exhaust seat area ($A_3$) whereby $A_3 > A_2 > A_1$;

a control port for control input (a) of the active area ($A_2$) of the diaphragm; and means for translation of the poppet from the exhaust seat to the supply seat in response to fluid pressure through the control input (a) acting on the diaphragm, including a force transmitting actuator extending from the diaphragm to the poppet.

2. The device of claim 1 wherein said device is symmetrical about axis through the poppet and diaphragm.

3. The device of claim 1 wherein said poppet and actuator are integral and translate along an axis in response to movement of the diaphragm.

4. The device of claim 1 wherein said cavity is formed in a base in opposed relation with a middle plate, and including a cover plate over the middle plate with the control port (a) connected therethrough to the chamber.

5. The device of claim 1 wherein said input (b) and output (c) are coplanar on one surface of the body member.

6. The combination of claim 1 including means for providing an OR fluid logic device in combination with the sequential inhibitor (NOT) device, said means including an input connection to the exhaust port (d).

* * * * *